United States Patent

Numaya et al.

[11] Patent Number: 5,977,670
[45] Date of Patent: Nov. 2, 1999

[54] CONNECTION STRUCTURE OF STEPPING MOTOR

[75] Inventors: Hiroyasu Numaya; Kouichi Satoh; Motohiko Ogawa; Atsushi Fujita; Toru Kayano, all of Nagaoka, Japan

[73] Assignee: Nippon Seiki Co., Ltd., Niigata, Japan

[21] Appl. No.: 09/171,491

[22] PCT Filed: Jan. 26, 1998

[86] PCT No.: PCT/JP98/00322

§ 371 Date: Oct. 20, 1998

§ 102(e) Date: Oct. 20, 1998

[87] PCT Pub. No.: WO98/38724

PCT Pub. Date: Sep. 3, 1998

[30] Foreign Application Priority Data

Feb. 28, 1997 [JP] Japan .................................. 9-045406

[51] Int. Cl.⁶ .......................... H02K 11/00; H02K 37/00; H02K 7/14
[52] U.S. Cl. ........................................... 310/71; 310/49 R
[58] Field of Search .......................... 319/49 R, 67 R, 319/71, 68 R, 91

[56] References Cited

U.S. PATENT DOCUMENTS

| | | | |
|---|---|---|---|
| 4,329,606 | 5/1982 | Montagu .................................. | 310/71 |
| 4,518,886 | 5/1985 | Kaneyuki .................................. | 310/71 |
| 4,714,850 | 12/1987 | Akiba et al. .......................... | 310/49 R |
| 5,004,941 | 4/1991 | Ohzeki et al. ......................... | 310/49 R |
| 5,173,628 | 12/1992 | Yoshida et al. ............................ | 310/71 |
| 5,214,331 | 5/1993 | Yonei ...................................... | 310/71 |
| 5,247,216 | 9/1993 | Borman ................................. | 310/49 R |
| 5,291,084 | 3/1994 | Shiolsuki et al. ....................... | 310/49 R |
| 5,481,144 | 1/1996 | Bunfield et al. .......................... | 310/71 |
| 5,635,781 | 6/1997 | Moritan .................................... | 310/71 |

FOREIGN PATENT DOCUMENTS

| | | |
|---|---|---|
| 60-062882 | 5/1985 | Japan . |
| 5-64411 | 3/1993 | Japan . |
| 8-037770 | 2/1996 | Japan . |
| 8-111971 | 4/1996 | Japan . |
| 9-074731 | 3/1997 | Japan . |

*Primary Examiner*—Nestor Ramirez
*Assistant Examiner*—Tran Nguyen
*Attorney, Agent, or Firm*—McDermott, Will & Emery

[57] ABSTRACT

The invention makes it possible to achieve an increased labor efficiency in connecting a stepping motor and a circuit board. It is intended to provide a structure of electrical connections between the stepping motor and the circuit board in which a main motor unit of the same construction can be used regardless of whether the circuit board is located at a front surface or at a rear surface of the stepping motor. In a preferred embodiment of the invention, a circuit board (50) carrying a control circuit is provided on a front surface of a stepping motor (70) from which a drive shaft (711) of the stepping motor (70) projects and first connecting terminals (52) which extend parallel to an axial direction of the drive shaft (711) and connect to the control circuit are provided on the circuit board (50), while a junction board (80) to be electrically connected to the stepping motor (70) is provided on a rear surface of the stepping motor (70), opposite to its front surface from which the drive shaft (711) projects. As the first connecting terminals (52) are inserted into and connected to second connecting terminals (73), which extend parallel to the axial direction of the drive shaft (711) corresponding to the first connecting terminals (52), the second connecting terminals (73) are electrically connected to the junction board (80), thereby establishing electrical connections between the stepping motor (70) and the circuit board (50).

4 Claims, 4 Drawing Sheets

CONNECTION STRUCTURE OF STEPPING MOTOR

BACKGROUND OF THE INVENTION

1. Field of the Invention

The present invention relates to a structure of electrical connections between a stepping motor and a circuit board. More particularly, it relates to a structure of electrical connections between a stepping motor and a circuit board suitable for those applications in which the stepping rmLtor is used as a prime mover of an analog instrument for a mobile unit, such as a motor vehicle.

2. Description of the Related Art

Conventionally, a cable terminated with or without a connector has usually been used to establish electrical connections between a stepping motor and a circuit board incorporating a control circuit for driving the stepping motor, for instance. This kind of conventional structure requires complex wiring work and inevitably increases the size of an instrument. There exist previous approaches to the solution of this problem, such as those proposed in Japanese Unexamined Patent Publication Nos. 8-111971 and 5-64411. These previous approaches are schematically depicted in FIG. 6, in which a stepping motor 3 rotatably accommodates a rotor 2 having a drive shaft 1, at least an output end of the drive shaft 1 projecting from a front surface (top side in FIG. 6) of the stepping motor 3, terminals 4 extending parallel to an axial direction of the drive shaft 1 are provided on the stepping motor 3, and circuit board 5 is provided on a rear surface (bottom s 4de in FIG. 6) of the stepping motor 3, opposite to its front surface from which the output end of the drive shaft 1 projects, wherein the stepping motor 3 is directly connected to the circuit board 5 by soldering the stepping motor 3 to the circuit board 5, for instance. This structure makes it possible to connect the stepping motor 3 and the circuit board 5 by using an automatic soldering process on a production line so that automation of the wiring work and cost reduction could be achieved.

There exists a growing tendency in recent years to use the stepping motor as a prime mover of an analog instrument installed on a mobile unit, such as a motor vehicle. In such applications, a pointer 6 may be fixed to an extreme end of the drive shaft 1 of the stepping motor 3 with a dial plate 7 located at the back of the pointer 6 as shown by broken lines in FIG. 6. In this kind of analog instrument, an alternative construction as shown in FIG. 7, for example, is occasionally employed. Specifically, terminals 4 of a stepping motor 3 extend in the same direction as the output end of a drive shaft 1 and a circuit board 5 is provided on a front surface (top side in FIG. 7) of the stepping motor 3, where the output end of the drive shaft 1 projects, wherein the output end of the drive shaft 1 passes through the circuit board 5 and light-emitting diodes (LEDs) 8 are mounted on the circuit board 5 to illuminate a pointer 6 and a dial plate 7 through a diffuser plate 9. This alternative makes it possible to achieve high-luminosity illumination with a simple construction and to reduce the thickness of the instrument.

When the circuit board 5 is provided on the front surface of the stepping motor 3 as shown in FIG. 7, however, it is not possible to use an automatic soldering process based on flow or reflow soldering technique on a production line, because the output end of the drive shaft 1 projects beyond the circuit board 5. Thus, this alternative construction inevitably requires manual soldering, resulting in a low labor efficiency in electrical wiring and an increase in production costs. A further problem is that the construction of a main motor unit of the stepping motor 3 varies depending on whether the circuit board 5 is located at the front surface or at the rear surface of the stepping motor 3 due to the difference in the structure of the terminals 4 so that it is impossible to use a common main motor unit for the aforementioned two instrument constructions.

SUMMARY OF THE INVENTION

The present invention has been made in the light of the aforementioned problems of the prior art. Accordingly, it is a principal object of the invention to provide a structure of electrical connections between a stepping motor and a circuit board which makes it possible to achieve an increased labor efficiency in connecting them to each other even when the circuit board is located at a front surface from which an output end of the stepping motor projects. It is another object of the invention to provide a structure of electrical connections between a stepping motor and a circuit board in which a main motor unit of the same construction can be used regardless of whether the circuit board is located at a front surface or at a rear surface of the stepping motor.

In one aspect of the invention, a structure of electrical connections between a stepping motor and a circuit board, in which the stepping motor rotatably accommodates a rotor having a drive shaft of which at least an output end portion projects from a first surface of the stepping motor, and the circuit board is located at a position facing the first surface of the stepping motor in such a way that the output end portion of the drive shaft penetrates the circuit board, comprises a first connecting terminal which is provided on the circuit board and extends parallel to an axial direction of the drive shaft, a junction board which is provided on a second surface of the stepping motor, opposite to the first surface of the stepping motor in the axial direction of the drive shaft, and is electrically connected to the stepping motor, and a second connecting terminal which extends parallel to the axial direction of the drive shaft corresponding to the first connecting terminal and establishes electrical connections between the stepping motor and the circuit board as one of the first and second connecting terminals Is inserted into and connected to the other.

In another aspect of the invention, the structure of electrical connections further comprises a retainer provided on the circuit board for positioning and holding the first connecting terminal.

In still another aspect of the invention, the structure of electrical connections further comprises a retainer provided on the stepping motor or on the circuit board for positioning and holding the second connecting terminal.

In yet another aspect of the invention, the stepping motor has a cover surrounding its outer surface and the retainer for positioning and holding the second connecting terminal is provided in the cover.

The invention is suited not only to such applications in which the stepping motor is used as a prime mover of an analog instrument for a mobile unit, such as a motor vehicle but also to a wide variety of applications in which the stepping motor is employed in equipment of various kinds.

DETAILED DESCRIPTION OF THE PREFERRED EMBODIMENT

A specific embodiment of the invention will now be described, byway of example, with reference to the accompanying drawings.

Figure 1:
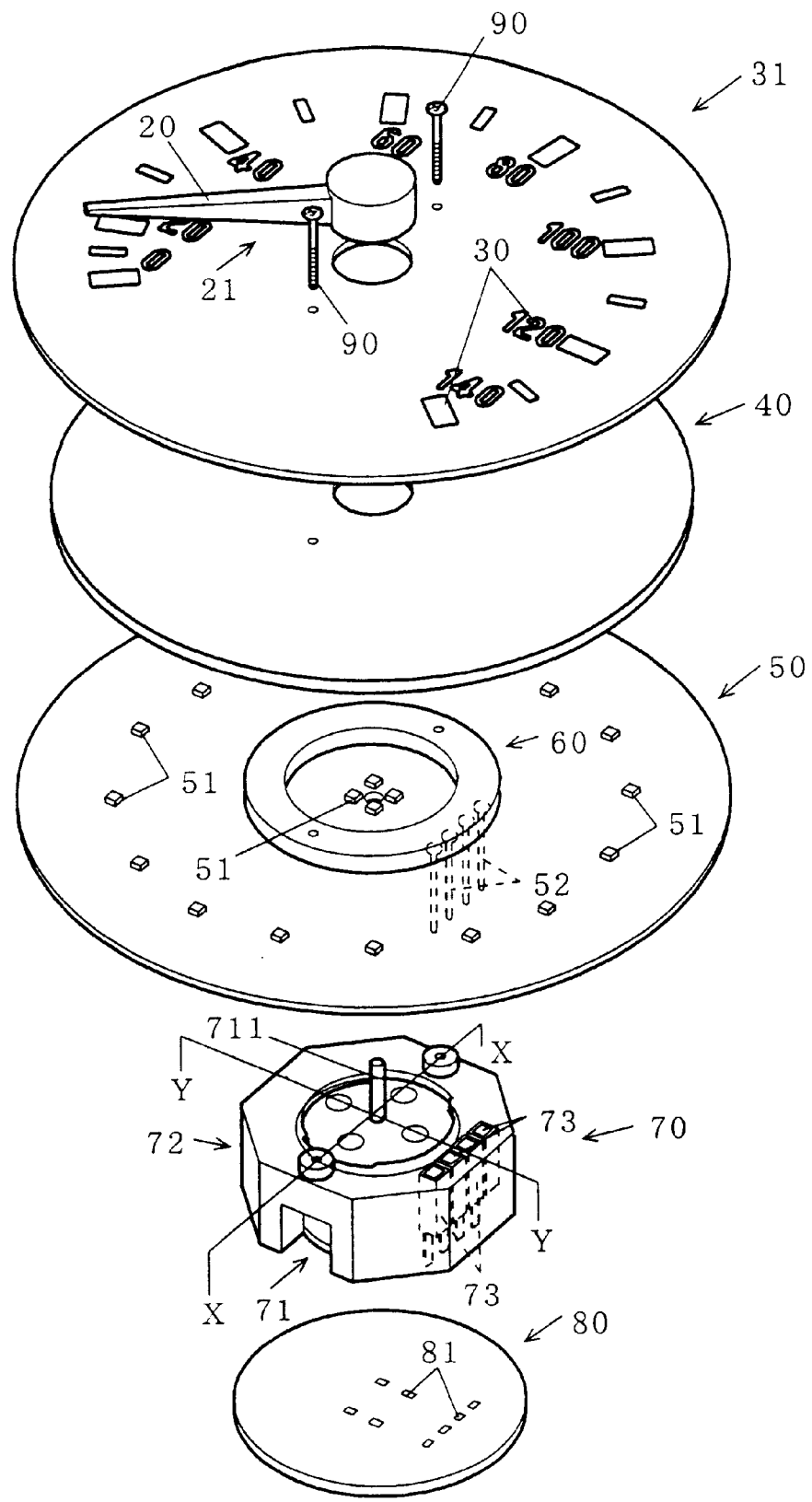
FIG. 1 is an exploded perspective view of an analog instrument employing a stepping motor according to a preferred embodiment of the invention.

Referring to FIG. 1, an analog instrument to be used as a speedometer of a motor vehicle, for example, comprises a pointer 21 having an elongate indicating portion 20, a dial plate 31 provided behind the pointer 21 bearing a scale 30 showing graduation lines, alphanumeric notations and other marks, as appropriate, a diffuser plate 40 which is formed of a light-transmitting material and provided behind the dial plate 31, a circuit board 50 provided behind the diffuser plate 40, a spacer 60 provided between the diffuser plate 40 and the circuit board 50, a stepping motor 70 provided behind the circuit board 50 and a junction board 70 provided behind the stepping motor 70. In this construction, the stepping motor 70 is driven to cause the pointer 21 to swing in accordance with changes in running speed of the vehicle so that the indicating portion 20 of the pointer 21 can indicate the vehicle speed against the background scale 30 of the dial plate 31.

The indicating portion 20 of the pointer 21 and the scale 30 of the dial plate 31 are each formed of a light-transmitting material. Both the indicating portion 20 and the scale 30 having a light-transmitting property are caused to glow when they are illuminated by chip-type light-emitting diodes (hereinafter referred to as LEDs) 51 mounted on the circuit board 50 through the diffuser plate 40. This helps ensure visibility of the analog instrument during the nighttime, for instance, when the surrounding area is dark.

The circuit board 50 is also provided with first connecting terminals 52 each having a round pinlike shape projecting toward the steppingmotor 70. Extending parallel to an axial direction of a later-described drive shaft 711 of the stepping motor 70, these first connecting terminals 52 are electrically connected to the stepping motor 70.

Figure 2:
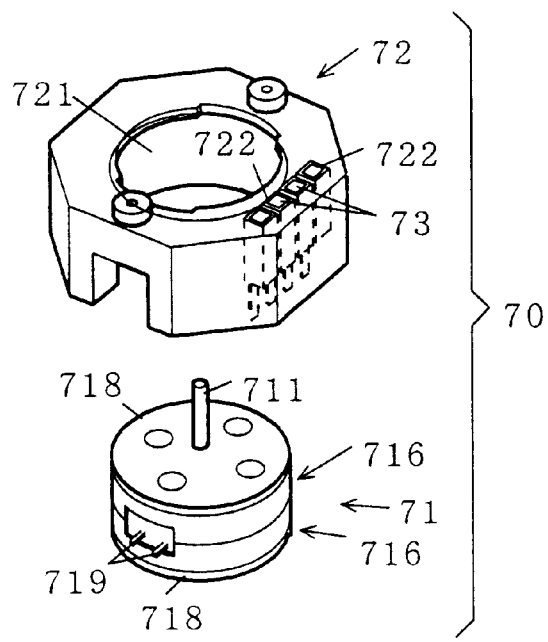
FIG. 2 is an exploded perspective view of the stepping motor of FIG. 1.

The stepping motor 70 is constructed essentially of a main motor unit 71 and a cover 72 which mainly surrounds a cylindrical cuter surface of the main motor unit 71, as shown in FIG. 2.

Figure 3:
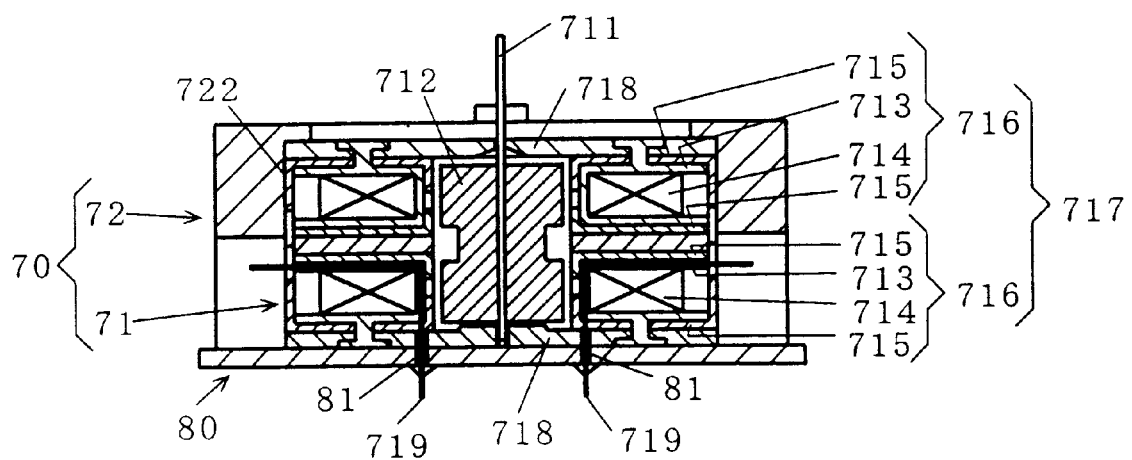
FIG. 3 is a sectional diagram of the stepping motor taken along lines X—X of FIG. 1.
Figure 4:
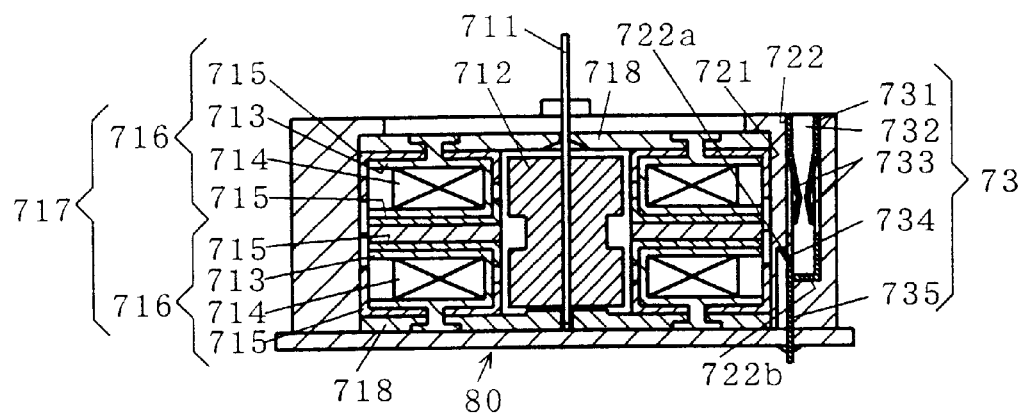
FIG. 4 is a sectional diagram of the stepping motor taken along lines Y—Y of FIG. 1.

The main motor unit 71 is of a so-called permanent magnet (PM) type. The main motor unit 71 includes a rotor 712 formed of a permanent magnet with the drive shaft 711 passing through its center, an annular stator 717 constructed by stacking two annular stator cores 716 coaxially along the axial direction of the drive shaft 711 of the rotor 712, each annular stator core 716 formed of a combination of a coil 714 wound around a ringlike bobbin 713 and a ringlike york 715, and a pair of bearing plates 718 fixed to each opening of the annular stator 717 as shown in FIGS. 3 and 4. The rotor 712 is accommodated in a central cavity of the annular stator 717 and the drive shaft 711 is rotatably supported by the two bearing plates 718 with an output end of the drive shaft 711 projecting outward from a front surface of the annular stator 717 (or of the stepping motor 70). The rotor 712 is caused to rotate by a driving signal (voltage) supplied to the coils 714 in accordance with the amount of change in the vehicle speed.

Referring to FIG. 3, a plurality or generally L-shaped terminals 719 are fixed in the ringlike bobbin 713 of the lower annular stator core 716 by a technique known as insert molding, in which one end of each terminal 719 projects outward in a radial direction of the rotor 712 and is electrically connected to the individual coils 714 while the other end projects downward in the axial direction of the drive shaft 711 and is electrically connected to the junction board 80.

Formed of an insulating material like a synthetic resin, the cover 72 has an accommodation space 721 for accommodating the main motor unit 71, second connecting terminals 73 and a retaining hole 722 for positioning and holding the individual second connecting terminals 73 as shown in FIGS. 2 and 3.

As depicted in FIG. 4, each of the second connecting terminals 73 includes a frame member 731 having a hollow boxlike shape opening at both ends and extending parallel to the axial direction of the drive shaft 711, an insertion hole 732 formed by a hollow internal space of the frame member 731, a pair of elastic connecting parts 733 having curved surfaces formed by partially cutting and pressing the frame member 731 to bulge inward in the insertion hole 732, an elastically deformable stopper 734 formed by partially cutting and pressing the frame member 731 to bulge outward from the frame member 731, and a contact element 735 which extends from the frame member 731 parallel to the axial direction of the drive shaft 711 and is electrically connected to the junction board 80. When the first connecting terminals 52 are inserted into the individual insertion holes 732, the connecting parts 733 come elastically in contact with the respective first connecting terminals 52, whereby the first connecting terminals 52 are electrically connected to the corresponding second connecting terminals 73. Electrical connections between the second connecting terminals 73 and the junction board 80 are established as the individual contact elements 735 are soldered to the junction board 80 in this construction.

The retaining hole 722 is formed to approximately fit the outer shape of an array of the frame members 731 and has a first stepped surface 722a which comes into contact with the stoppers 734 of the second connecting terminals 73 as well as a second stepped surface 722b which comes into contact with ends of the frame members 731 in the axial direction of the drive shaft 711. Movement of the second connecting terminals 73 along the axial direction of the drive shaft 711 is restricted by the first stepped surface 722a and the second stepped surface 722b.

The junction board 80 has a plurality of through holes 81 which the terminals 719 and the contact elements 735 of the second connecting terminals 73 of the stepping motor 70 pass through. The terminals 719 and the contact elements 735 of the second connecting terminals 73 of the stepping motor 70 are inserted into the corresponding through holes 81 and their extreme ends which have appeared to the back of the junction board 80 are soldered so that the terminals 719 and the second connecting terminals 73 are electrically connected to the junction board 80. Since soldering points where the terminals 719 and the contact elements 735 of the second connecting terminals 73 of the stepping motor 70 are soldered to the junction board 80 are properly wired by an unillustrated circuit pattern, electrical connections from the terminals 719 and the second connecting terminals 73 to the individual coils 714 are completed by the aforementioned soldering operation.

Figure 5:
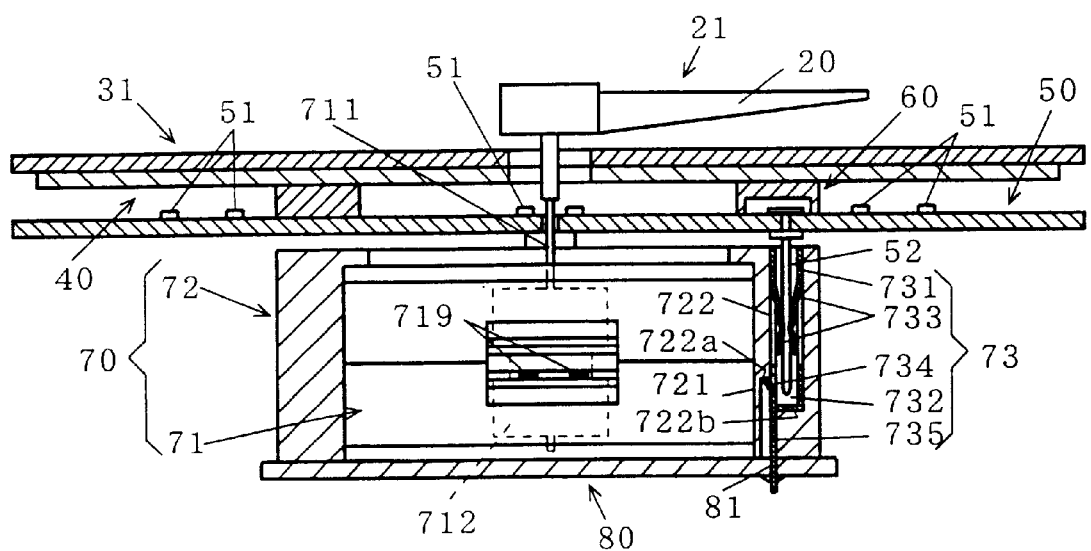
FIG. 5 is a sectional diagram showing how individual elements of FIG. 1 are assembled together.
Figure 6:
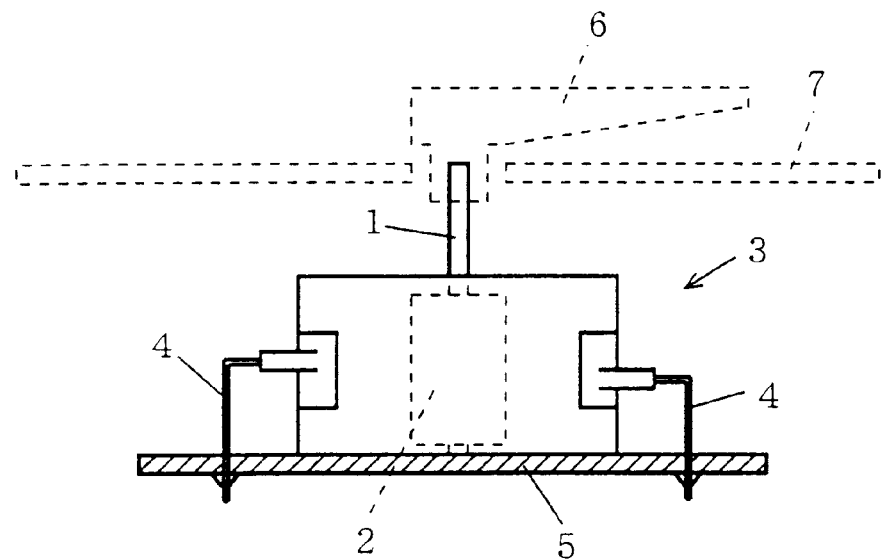
FIG. 6 is a sectional diagram showing a conventional construction.
Figure 7:
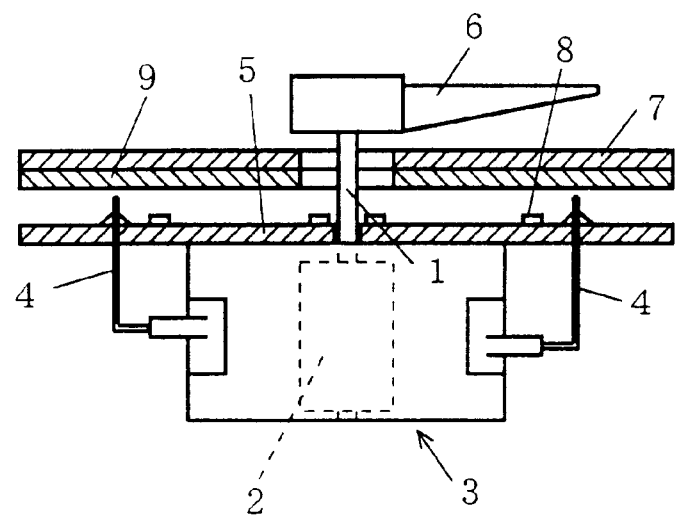
FIG. 7 is a sectional diagram showing another conventional construction.

Described in the following with reference to FIGS. 1 and 5 is how the analog instrument of the present embodiment is assembled.

First, the first connecting terminals 52 are soldered to the circuit board 50 and the second connecting terminals 73 are accommodated and positioned in the retaining hole 722 in the cover 72 of the stepping motor 70. The second connecting terminals 73 may be fitted in position in the cover 72 by embedding the second connecting terminals 73 in the cover 72 when molding the cover 72.

Then, the junction board 80 is fixed to a rear surface (bottom side in FIG. 5) of the stepping motor 70, opposite to its front surface (top side in FIG. 5) from which the drive shaft 711 projects and to which the circuit board 50 is attached, and the terminals 719 and the second connecting terminals 73 (contact elements 735) of the stepping motor 70 are soldered to the junction board 80 to establish electrical connections. It is to be pointed out that the terminals 719 and the second connecting terminals 73 of the stepping motor 70 can be connected to the junction board 80 on an automatic soldering line. The junction board 80 is fixed to the stepping motor 70 by bending clamping tabs (not shown) which protrude from the main motor unit 71 toward the junction board 80 and are passed through the junction board 80 and thermowelding welding projections (not shown) which protrude from the cover 72 toward the junction board 80 and are passed through the junction board 80.

Next, the circuit board 50 is placed in front of the front surface of the stepping motor 70 from which the drive shaft 711 projects, and the drive shaft 711 is caused to pass through the circuit board 50 while inserting the first connecting terminals 52 into the insertion holes 732 in the second connecting terminals 73 to establish electrical connections between the first connecting terminals 52 and the second connecting terminals 73. Alternatively, the front surface of the stepping motor 70 fitted with the junction board 80 is positioned at the back of the circuit board 50, and the first connecting terminals 52 are inserted into the insertion holes 732 in the second connecting terminals 73 to establish electrical connections between the first connecting terminals 52 and the second connecting terminals 73. Such a process of joining the stepping motor 70 (second connecting terminals 73) and the circuit board 50 (first connecting terminals 52) can be performed on an automatic assembly line.

The circuit board 50 of this embodiment carries, in addition to the first connecting terminals 52 and the LEDs 51, a control circuit (not shown) which supplies the voltage signal to the stepping motor 70 (individual coils 714) in accordance with the amount of change in the vehicle speed. This control circuit is electrically connected to the first connecting terminals 52 by an unillustrated circuit pattern and electrical connections between the control circuit and the individual coils 714 are established when the first connecting terminals 52 and the second connecting terminals 73 are connected together by inserting the former into the latter.

Subsequently, the spacer 60, the diffuser plate 40 and the dial plate 31 are placed on the circuit board 50 in such a way that the drive shaft 711 passes through the spacer 60, the diffuser plate 40 and the dial plate 31. The stepping motor 70, the circuit board 50, the spacer 60, the diffuser plate 40 and the dial plate 31 are fixed together by screws 90 to form a single structure.

Lastly, the pointer 21 is fixed to an extreme end of the drive shaft 711 projecting from the dial plate 31 to complete assembly of the analog instrument.

As described in detail with reference to the preferred embodiment hereinbefore, the circuit board 50 carrying the control circuit is provided on the front surface of the stepping motor 70 from which the drive shaft 711 projects and the first connecting terminals 52 which extend parallel to the axial direction of the drive shaft 711 and connect to the control circuit are provided on the circuit board 50, while the junction board 80 to be electrically connected to the stepping motor 70 is provided on the rear surface of the stepping motor 70, opposite to its front surface from which the drive shaft 711 projects. As the first connecting terminals 52 are inserted into and connected to the second connecting terminals 73, which extend parallel to the axial direction of the drive shaft 711 corresponding to the first connecting terminals 52, the second connecting terminals 73 are electrically connected to the junction board 80, thereby establishing electrical connections between the stepping motor 70 and the circuit board 50 (control circuit). In this structure, the stepping motor 70 is electrically connected to the circuit board 50 by inserting the first connecting terminals 52 on the circuit board 50 into the second connecting terminals 73 on the stepping motor 70 so that it is possible to eliminate the need for soldering (in particular manual soldering) between the stepping motor 70 and the circuit board 50. This facilitates electrical wiring and permits the wiring work to be done on an automatic assembly line, providing an increased labor efficiency and an eventual cost reduction. Furthermore, it is not necessary to vary the construction of the main motor unit 71 of the stepping motor 70 regardless of whether the circuit board 50 is located at the front surface or at the rear surface of the stepping motor 70. it is therefore possible to commonly use the same main motor unit 71 and this permits an additional cost reduction.

Since the retaining hole 722 for positioning and holding the individual second connecting terminals 73 is formed in the cover 72 of the stepping motor 70, it is possible to retain the second connecting terminals 73 in exact position in a stable manner. This serves to prevent displacement and deformation of the individual second connecting terminals 73 and improve labor efficiency and reliability in the wiring work. As an alternative, the retaining hole 722 for positioning and holding the second connecting terminals 73 may be provided as a discrete component which is fixed to the junction board 80, separately from the stepping motor 70.

In this embodiment, the stepping motor 70 has the cover 72 which mainly surrounds the cylindrical outer surface of the main motor unit 71 and the retaining hole 722 is for positioning and holding the individual second connecting terminals 73 is formed in the cover 72. This construction eliminates the need for providing a dedicated retaining part on the junction board 80 and thereby serves to reduce the number of components.

Although the first connecting terminals 52 are each formed into a round pinlike shape while the second connecting terminals 73 are each formed into a generally boxlike shape into which the round finlike first connecting terminals 52 can be inserted to make electrical connections in the foregoing embodiment, it is possible to form the second connecting terminals 73 into a rodlike shape and the first connecting terminals 52 into a boxlike shape into which the individual second connecting terminals 73 can be inserted to establish electrical connections as far as the first and second connecting terminals 52, 73 can be electrically connected. In the latter case, a retaining part for positioning and holding the boxlike first connecting terminals 52 may be fixed to the circuit board 50.

Moreover, although only the second connecting terminals 73 are positioned and held by the retaining hole 722 in the embodiment, its construction may be varied such that both the first and second connecting terminals 52, 73 are positioned and held by a retaining part.

The construction of the first and second connecting terminals 52, 73 is not limited to the aforementioned rodlike and boxlike shapes but may be varied to desired shapes as far as the first and second connecting terminals 52, 73 extend parallel to the axial direction of the drive shaft 711 and their electrical connections are established by inserting the first connecting terminals 52 into the second connecting terminals 73, or vice versa.

What is claimed is:

1. A structure of electrical connections between a stepping motor and a circuit board, in which said stepping motor rotatably accommodates a rotor having a drive shaft of which at least an output end portion projects from a first surface of said stepping motor, and said circuit board is located at a position facing the first surface of said stepping motor in such a way that the output end portion of said drive shaft penetrates said circuit board, said structure comprising:

a first connecting terminal which is provided on said circuit board and extends parallel to an axial direction of said drive shaft;

a junction board which is provided on a second surface of said stepping motor, opposite to the first surface of said stepping motor in the axial direction of said drive shaft, and is electrically connected to said stepping motor; and a second connecting terminal which extends parallel to the axial direction of said drive shaft corresponding to said first connecting terminal and establishes electrical connections between said stepping motor and said circuit board as one of said first and second connecting terminals is inserted into and connected to the other.

2. The structure of claim 1 further comprising a retainer provided on said circuit board for positioning and holding said first connecting terminal.

3. The structure of claim 1 further comprising a retainer provided on said stepping motor or on said circuit board for positioning and holding said second connecting terminal.

4. The structure of claim 3, wherein said stepping motor has a cover surrounding its outer surface and said retainer for positioning and holding said second connecting terminal is provided in said cover.

* * * * *